May 25, 1954     M. R. EUVERARD     2,679,237
METERING DEVICE

Filed Nov. 1, 1952     2 Sheets-Sheet 1

INVENTOR.
Maynard R. Euverard
BY
ATTORNEY.

May 25, 1954     M. R. EUVERARD     2,679,237
METERING DEVICE

Filed Nov. 1, 1952                                   2 Sheets-Sheet 2

INVENTOR.
Maynard R. Euverard
BY
ATTORNEY.

Patented May 25, 1954

2,679,237

UNITED STATES PATENT OFFICE 2,679,237

METERING DEVICE

Maynard R. Euverard, Short Hills, N. J., assignor to Interchemical Corporation, New York, N. Y., a corporation of Ohio Application November 1, 1952, Serial No. 318,282

1 Claim. (Cl. 121—164)

This invention relates to an improved metering device of which the following is a specification.

In my co-pending application Serial No. 294,033, filed June 17, 1952, of which this is a continuation-in-part, I have disclosed a fluid metering device. The present disclosure pertains to certain improvements of the said fluid metering device which will be found described in detail in the specification and illustrated in the accompanying drawings, in which.

Figure 1:
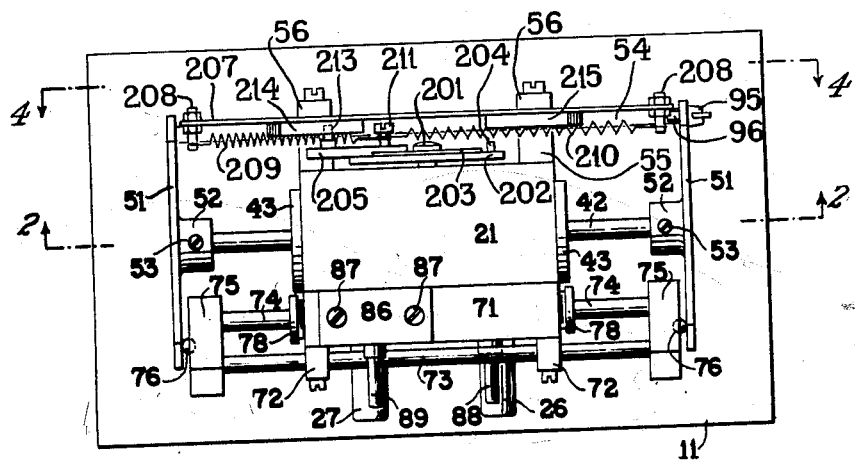
Fig. 1 is a plan view of the assembled device.
Figure 2:
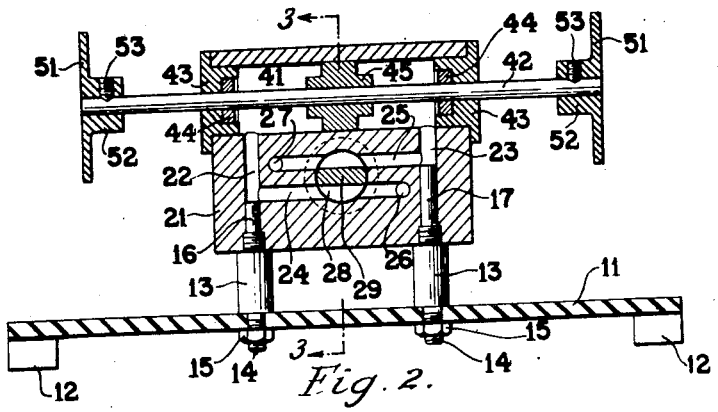
Fig. 2 is a sectional view taken on the line 2—2 of Fig. 1.

Referring more specifically to the drawings, according to the said patent and shown in this application, the device is fastened to a base plate 11 which rests on the bars 12. As illustrated, one way of mounting the device is by means of two columns 13 provided with threaded shanks 14 that are set into the base and are fastened thereto by means of the nuts 15. The threaded shafts 16 and 17 extending upward of the columns are dimensioned so as to fit into and to partly plug the borings 22 and 23 drilled vertically through the block 21 of the metering device. The open portions of these borings communicate with the conduits 24 and 25 drilled horizontally through the block. The first of the said conduits connects to the fluid inlet 26 and the second connects to the fluid outlet 27. Inserted into the conduits is the valve port 28 fitted with the rotary valve 29 and the valve retainer 30. The valve is held in position by bearings 31 and 32 which, at the same time, serve as closures for the valve port. The valve is arranged to be turned by means of an oscillating drive, which will be found described in detail further below.

The boring 41 drilled through the block constitutes the metering cylinder. As shown, this cylinder is in communication with the borings 22 and 23 and, by way of these borings, with the conduits 24 and 25 and the valve port 28. Inserted into the pump cylinder is the drive rod 42, held in alignment by the cylinder end caps 43 provided with gaskets 44. Fastened to the said drive rod and suitably fitted to reciprocate within the cylinder is the piston 45.

Attached to the said drive rod are two cross bars which, as indicated in Fig. 1, hold between themselves the oscillator tripping bar 54, guided by the two brackets 55 and retained in position by the caps 56 screwed onto the brackets. However, I prefer to replace the cross bars by end plates 51, conveniently having the shape of circular disks with opposite segments cut away. The end plates are provided with sleeves 52 which fit over the ends of the drive rod and are fastened thereto by means of the locking screws 53. Arranged between these end plates to be moved reciprocally by them but, preferably, not fixedly attached to them, is the said tripping bar. One way of avoiding a shift in the position of the end plates 51 about the axis of the main drive rod while the device is in operation is to lock the end plates to the tripping bar 54. For this purpose, the bolt 96 secured by the wing nut 95 is inserted into a slot suitably provided at one end of the end plates. This bolt and a stop pin 97 are spaced so as to confine one end of the tripping bar therebetween. By moving the bolt 96 out of the way of the tripping bar, the end plates can be turned into a position whereby they clear the tripping bar.

Rotatably mounted between the block 21 of the metering device and a bearing bolt 201 inserted into the said block is an oscillator wheel 202, comprising a cam-shaped boss 203, a roller 204, and a driving arm 205, diametrically opposite to the said roller and extending over the rim of the oscillator wheel as shown.

Figure 3:
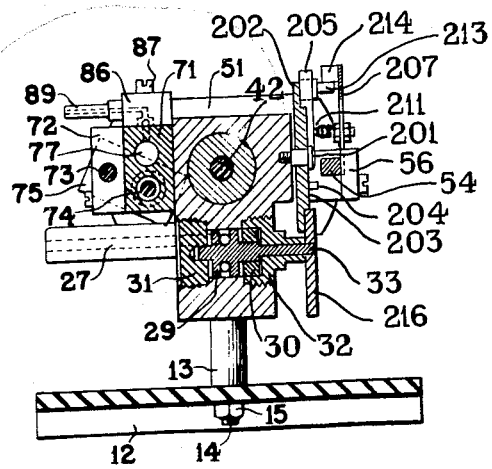
Fig. 3 is a sectional view taken on the line 3—3 in Fig. 2.
Figure 4:
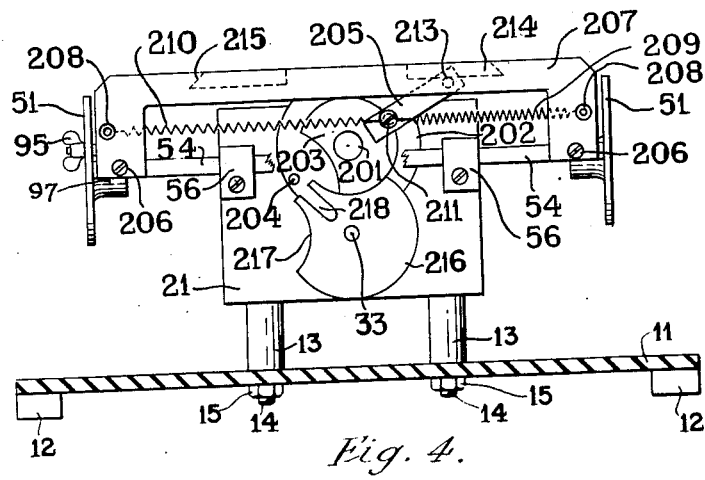
Fig. 4 is a rear elevation of the device.

As illustrated more particularly in Figs. 1, 3, and 4, there is fastened to the tripping bar 54, by means of anchor bolts 206, an oscillator control frame 207 and to the latter, by means of anchor pins 208, two springs 209 and 210 which, at their other end, are jointly fastened to a screw stud 211 of the above-mentioned driving arm 205. The said driving arm carries, at its other extremity, a sliding pin 213 which, during part of the reciprocal motion of the tripping bar 54 and the frame 207, slides along the bottom surface of the valve control slide bars 214 and 215 which are fastened to the said frame, for the said pin to trip over the edge of one of these bars at the end of the reciprocal motion.

In order to impart the necessary intermittent movement to the rotary valve 29, there is mounted, on the valve stem 33 and in operative alignment with the oscillator wheel, a slotted disk 216, characterized by having concave cut-outs 217 at either side of the slot 218 which alternately engage the cam-shaped boss 203 of the oscillator wheel in order to prevent a rotation of the said slotted wheel unless the roller 204 of the oscillator engages the slot.

With the rotary valve 29 and the piston 45 in a position as shown, if a liquid under pressure enters through the fluid inlet 26, a direct passage of the liquid to the fluid outlet 27 is prevented by the rotary valve. The liquid is forced through the boring 22 into the space to the left of piston 45 and, because of its pressure, forces the piston to move to the right. The end plates 51 fastened to the drive rod 42 force the oscillator tripping bar 54 and the oscillator control frame, attached thereto, to also move to the right. As a result thereof, the spring 210 exerts an increasing tension between its anchor pin 208 and the screw stud 211 to which it is fastened at the other end. As long as the sliding pin 213 of the driving arm 205 is forced to glide along the lower surface of the valve control slide bar 214 which is moving to the right together with the oscillator control frame, the spring is prevented from rotating the oscillator wheel 202.

However, the instant the pin trips over the knife-edge of the said slide bar, the spring, now at maximum stretch, quickly accelerates the driving arm and the oscillator wheel 202 through a rotational movement of about 120°. The roller 204 of the oscillator wheel engages the slot 218 of the disk 216 and, by turning the latter, rotates the valve 29, practically instantaneously, into the opposite position.

As a result of this 90° change in the position of the valve, the incoming liquid is now forced to travel from the fluid inlet 26 through the conduit 25, into the boring 23 and thence into the right hand space of cylinder 41, forcing the piston 45 to reverse its direction of travel. In the meantime, while the piston was moving to the right, liquid accumulated in front of the piston was forced through the fluid outlet 27.

It is important that, at the end of the above-described rotational movement, there is still more tension in spring 210 than in the opposing spring 209. The driving arm 205 is thereby retained in position until the drive rod 42 has commenced the return stroke and the oscillator control frame 207, participating in the return movement, has brought the valve control slide bar 215 into engagement with the sliding pin 213 which counteracts the increasing tension of spring 209 and prevents any rotation of the oscillator wheel 202 until the piston has reached the extent of its travel to the left, at which time the sliding pin 213 is released by the valve control slide bar 215 and movement to the right is resumed again.

The main advantage of this improvement is that the stroke length of the piston 45 is fixed and that the rotational movement of the valve 29 is induced with greatly increased velocity, because the springs 209 and 210 can be chosen of relatively great length and considerable strength which prevents excessive stretching and the consequent fatigue and early break of shorter springs. Since the amount of stretch is now always constant, each tripping is effectuated by the same amount of energy. As a result of this improvement, the apparatus can be used as a metering device. The number of strokes times a constant equals the volume of fluid passing through the device. The constant represents the total displacement of the piston during one complete cycle. For metering purposes, a suitable cyclic counter such as a Veeder-Root counter, can be attached to the device and a suitable mechanical linkage between the counter and the reciprocating portion of the device can be provided in order to register the number of cycles during a given time of operation.

I claim:

In a metering device comprising a casing having a fluid inlet and a fluid outlet, a valve port, two conduits suitably spaced to traverse the valve port, the first of the said conduits connecting to the fluid inlet and the second connecting to the fluid outlet, ducts connecting the said conduits to opposite extremities of a cylinder suitably attached to the said casing, end caps for the cylinder, a piston reciprocally fitting into the cylinder, a piston rod extending through the cylinder end caps, cross bars fastened to the tips of the piston rod, a tripping bar reciprocally fitted between the said cross bars and attached thereto parallel to the piston rod, a rotary valve arranged in the said valve port to permit the passage of incoming fluid through the first of the said ducts and the passage of outgoing fluid through the second of the said ducts when turned into one position, and to permit the passage of outgoing fluid through the first of the said ducts and the passage of incoming fluid through the second of the said ducts when turned into another position, closures for the valve port, a valve stem extending through one of the closures, the improvement of a slotted disk mounted on the said valve stem, the said disk being characterized by having concave cut-outs at either side of the slot, an oscillator wheel rotatably mounted on the said casing in operative alignment with the said slotted disk, said oscillator wheel comprising a cam-shaped boss which alternately engages the said concave cut-outs of the slotted disk, a roller which engages the slot of the said slotted disk in alternate positions and, diametrically opposite to the said roller, a driving arm extending over the rim of the oscillator wheel and carrying a sliding pin at the end, an oscillator control frame fastened to the said tripping bar, two springs each having one end fastened to one of the extremities of the oscillator control frame and the other ends jointly attached to a collar at the base of the said driving arm, and two valve control slide bars fastened to the said oscillator control frame, for the said sliding pin to trip over the edge of one of these bars at the end of the reciprocal motion.

References Cited in the file of this patent

UNITED STATES PATENTS

| Number | Name | Date |
|---|---|---|
| 892,531 | Lewis | July 7, 1908 |
| 1,841,568 | Bradley | Jan. 19, 1932 |
| 2,034,086 | Clima et al. | Mar. 17, 1936 |